United States Patent Office 3,297,364
Patented Jan. 10, 1967

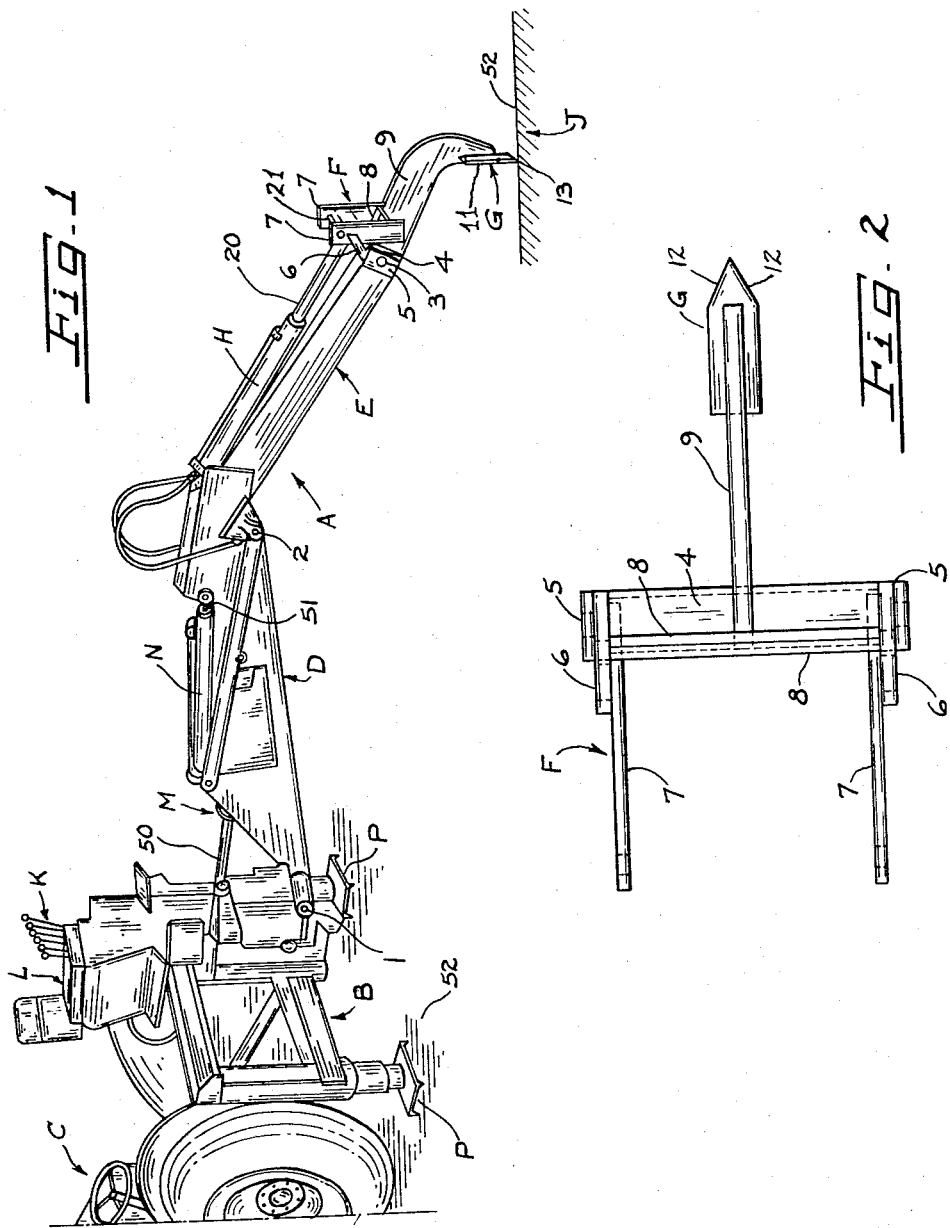

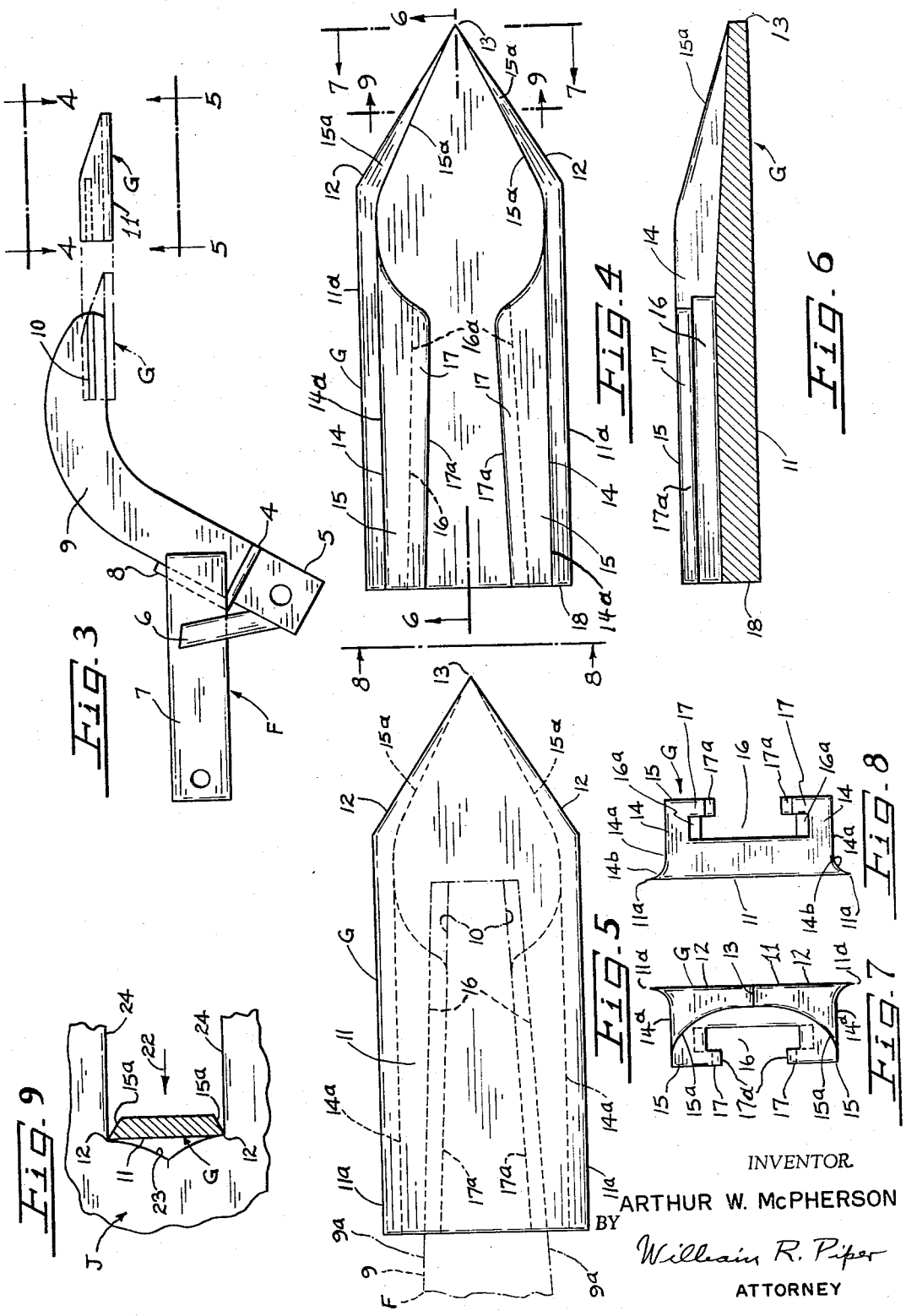

3,297,364
TOOTH FOR CUTTING HARD MATERIAL SUCH AS BLACKTOP
Arthur W. McPherson, 1658 Mary C. Drive, Napa, Calif. 94558
Filed Nov. 16, 1964, Ser. No. 411,487
2 Claims. (Cl. 299—36)

The present invention relates to improvements in a cutting tooth and control bracket for backhoe and it consists in the combination, construction, and arrangement of parts as hereinafter described and claimed.

An object of my invention is to provide a cutting tooth and bracket that can be quickly attached to or detached from a crowd of a backhoe and to a bucket cylinder shaft. The operator of the backhoe can manipulate the boom, crowd and shaft for causing the bracket to move the cutting tooth into a blacktop for cutting purposes.

A further object of my invention is to provide a device of the type described in which the cutting tooth is shaped so as to penetrate and cut blacktop or other material without the tooth having any tendency to lift the portion of blacktop adjacent to it. The tooth has a pointed end with a flat front surface and inwardly inclined sides, the sides being undercut on a bevel at the pointed end so that the front surface is the broadest, are presented to the blacktop during the cutting action. The body of the tooth also has a front surface which is contiguous to the front surface of the pointed end and this body front surface has parallel side edges that project beyond the parallel sides of the body.

Thus the body front surface will also present the broadest area to the blacktop for cutting purposes should the thickness of the blacktop be such as to necessitate the tooth cutting deeper than the length of the pointed end. Therefore the sides of the tooth from the pointed end and back through the length of the body extend inwardly from the front surface so as to be of less width immediately in back of the front surface than the width of the front surface at any point. The tooth in cutting the blacktop is immediately relieved from pressure after the front surface makes its initial cut into it and there will therefore be no tendency for the tooth to lift the surrounding blacktop during the cutting operation.

The device is simple in construction and durable and efficient for the purpose intended.

Other objects and advantages will appear as the specification continues. The novel features of the invention will be set forth in the appended claims.

*Drawings*

For a better understanding of my invention, reference should be made to the accompanying drawings forming a part of this specification as follows:

FIGURE 1 is a perspective view of a backhoe attachment for a tractor and shows my novel cutting tooth and bracket attached to it.

FIGURE 2 is a rear view of my cutting tooth and the bracket that supports it and is shown on a larger scale than FIGURE 1.

FIGURE 3 is a side elevation of FIGURE 2 and indicates how the cutting tool is removably mounted on the shank of the supporting bracket.

FIGURE 4 is a rear elevation of the cutting tooth when looking in the direction of the arrows 4—4 of FIGURE 3, the tooth being shown on a larger scale.

FIGURE 5 is a front elevation of the tooth when looking in the direction of the arrows 5—5 of FIGURE 3. This tooth is shown on the same scale as FIGURE 4 and illustrates how it can be removably mounted on the shank of the supporting bracket.

FIGURE 6 is a longitudinal section through the tooth and is taken along the line 6—6 of FIGURE 4.

FIGURE 7 is a front elevation of the tooth when looking in the direction of the arrows 7—7 of FIGURE 4.

FIGURE 8 is a rear elevation of the tooth when looking in the direction of the arrows 8—8 of FIGURE 4.

FIGURE 9 is a transverse section taken along the line 9—9 of FIGURE 4, and shows the tooth cutting blacktop or other ground.

While I have shown only the preferred form of my invention, it should be understood that various changes, or modifications, may be made within the scope of the annexed claims without departing from the spirit thereof.

*Detailed description*

In carrying out my invention, I make use of a backhoe indicated generally at A in FIGURE 1. This backhoe has a main frame B that is attached to a tractor partially shown at C. The manner of attaching the frame B to the tractor C is not shown because it forms no part of my invention.

The backhoe has a boom D that is pivoted to the frame B at 1. A crowd E is pivoted to the boom at 2. The bracket F for supporting a cutting tooth G is pivotally mounted at 3 to the outer end of the crowd E. I show the bracket F on a larger scale in FIGURES 2 and 3, and it will be seen that the bracket has a cross piece 4 and this cross piece carries spaced apart bearing blocks 5. FIGURE 1 shows the bearing blocks being pivotally mounted on the pin 3.

The side view of the bracket F shown in FIGURE 3 illustrates that the bearing blocks 5 have straps 6 that are welded or otherwise secured to parallel arms 7. A second cross piece 8 extends between the parallel arms 7 and is positioned at right angles to the cross piece 4 so that the adjacent edges of the two cross pieces can be welded together. FIGURE 2 shows a shank 9 having one end welded to the centers of the cross pieces 4 and 8. The outer end of the shank is curved and has its sides grooved at 10, see FIGURE 3, for removably receiving the cutting tooth G. FIGURE 3 shows the tooth G in full lines and placed in a position to be moved onto the free end of the shank 9. The parallel arms 7 straddle the outer end of a cylindrical shaft 20 that extends from a hydraulic cylinder H, see FIGURE 1. The shaft 20 is pivoted to the outer ends of the arms 7 at 21 and the purpose of this will be described when explaining the operation of the device.

It is best now to describe the cutting tooth G in detail because it is this type of tooth that can cut a blacktop surface along a line without prying loose sections of the blacktop lying adjacent to the line of cut. The same tooth can also be used for breaking up rock that may be in the ground and that lies in the path of the cutting tooth. In FIGURES 4 to 9 inclusive, I show the cutting tooth G in detail. The upper surface 11 of the tooth is flat and the front portion of this surface has converging sides 12—12 that lead to a pointed end 13, see FIGURES 4 and 5. This pointed end may be slightly rounded not indicated in these figures.

The cutting tooth G has a body portion formed by two integral sides 14—14 and these sides have outer surfaces 14a that are spaced inwardly a slight distance from the side edges 11a of the top surface of the cutting tooth, see FIGURE 8. This figure shows that there is a curved portion 14b that extends from the outer surfaces 14a of the parallel sides 14 to the outer edges 11a of the top surface 11. The cutting tooth G is tempered along the edges 11a so as to make it extremely strong and tough to withstand the high abrasive forces that the tooth encounters as it cuts through the blacktop or rock.

FIGURE 6 illustrates how each side 14 has a definite height for over one half the length of the tooth G, and then the lower edge 15 of the side (shown as an upper edge in the inverted tooth in FIGURE 6), slopes toward the upper surface 11 and the pointed end 13, and this sloping under edge is indicated at 15a. Referring to FIGURES 7 and 9 which are front and sectional views of the tooth, it will be seen that the inclined portions 15a of the sides 14 are bevelled inwardly so that the converging sides 12—12 of the upper surface 11 will be spaced further apart at any transverse section taken through the tooth than the remaining portion of the tooth lying in the same section. The transverse section through the tooth in FIGURE 9 shows the pointed end of the tooth as having the sides 15a bevelled inwardly from the top surface 11.

I have found that this bevelled undercutting at 15a, provides a tooth which will cut into the blacktop along the inclined edges 12 of the upper tooth surface 11 and the tooth will have no tendency to lift the layer of blacktop adjacent to the tooth during its movement because the inwardly extending bevelled sides 15a will immediately relieve the cutting pressure of the tooth against the blacktop. This is an important feature of my cutting tooth and is illustrated in FIGURE 9. The tooth G is shown in section and as moving in the direction of the arrow 22 through the blacktop J. The tooth breaks the blacktop at 23 just ahead of its front surface 11, and the sides 24 of the cut extend from the tooth edges 12 and do not bear against the bevelled edges 15a.

The integral sides 14—14 are spaced from each other and provide a central recess 16 for receiving the shank 9 of the bracket F, see the dash lines in FIGURE 5, showing the shank 9. The sides 14 have inwardly extending flanges 17 and the inner edges 17a of these flanges extend at a slight angle with respect to the longitudinal axis of the tooth so as to form a wedge-shaped area between the flanges. FIGURE 5 shows how the flanges 17 have their wedge-shaped edges 17a received in the grooves 10 in the sides of the shank 9. The grooves 10 have their inner edges also in the form of a wedge so that when the cutting tooth is moved onto the shank 9, the flanges 17 will enter the grooves 10 in the shank and the wedge-shaped edges 17a of the flanges will become wedged against the bottoms of the grooves 10. In this way the cutting tooth is securely held on the shank 9 and no bolts or other fastening means is necessary. All of the force exerted by the cutting action of the tooth in the blacktop or rock will be in a direction to force the tooth further onto the shank 9 and this will keep the tooth from falling off the shank. When it is desired to remove the tooth it is a simple matter to use a hammer and strike the back 18 of the tooth so as to drive the tooth forwardly and free it from the shank.

FIGURE 5 also shows the sides 9a of the shank as being slightly wedged-shaped. The tooth may have the side walls 16a of the central recess 16 formed slightly wedge-shaped so that these sides will aid in frictionally contacting with the sides 9a of the shank 9 for holding the cutting tooth in place on the shank. FIGURES 4, 5 and 9 show the front tapered portion of the tooth with the undercut bevelled sides 15a and FIGURES 4, 5, 7 and 8 show how the undercut bevelled sides 15a of the tooth merge into curved portions 14b on the sides 14 of the tooth. If the tooth should cut deeper into the black than the lengths of the converging sides 12 of the upper surface 11, then the edges 11a will cut into the blacktop and these edges are placed further apart than the outer surfaces 14a of the sides 14 of the tooth. This means that should the edges 11a cut into the blacktop, then the cutting action is immediately relieved by the inwardly curved portions 14b and the tooth will have no tendency to lift the surrounding portion of the blacktop during the cutting action. This feature is also important. All portions of the tooth that do the direct cutting of the blacktop or rock are case hardened so as to give a long life to the tooth.

Operation

From the foregoing description of the various parts of the device, the operation thereof may be readily understood. Since the bracket F has its bearing blocks 5 pivotally secured at 3 to the outer end of the crowd E, the bracket with its cutting tooth G, can be moved by the operator toward or away from the main frame B of the backhoe by manipulating certain levers in the bank of control levers K, in a well known manner. The backhoe forms no part of my invention except as it controls the movement and swinging of the bracket F. The type of backhoe illustrated in FIGURE 1 is manufactured by Massey-Ferguson Inc., Detroit, Michigan, and is designated model MF220. Only a portion of the tractor C is shown.

The operator sits in the seat L and actuates the levers K, for controlling the swinging of the boom D, about its pivot 1 on the backhoe, and for controlling the swinging of the crowd E, about its pivot 2, at the outer end of the boom. The hydraulic cylinder M, in FIGURE 1, and the piston rod 50 cause the boom to swing about the pivot 1, while the hydraulic cylinder N and the piston rod 51 cause the crowd E to swing about the pivot 2. The parallel arms 7 are pivotally secured to the outer end of the cylindrical shaft or piston rod 20 that is operated by the hydraulic cylinder H. The bracket F can therefore be swung about its pivot 3 when the operator manipulates certain levers K for causing the hydraulic cylinder H to move the piston rod 20.

In FIGURE 1, the surface 52 of the blacktop J is indicated and the cutting tooth G is shown as having its pointed end 13 contacting with the blacktop surface preparatory to cutting into it. The main frame B of the backhoe has a pair of drop pads or stabilizer feet P, see FIGURE 1, and the operator can cause these to be moved into engagement with the surface 52 of the blacktop J and they will prevent the tractor from moving during the cutting operation of the tooth G in the blacktop J if the operator so desires. In actual practice, the operator in cutting a line along the blacktop J, that will penetrate the blacktop, first moves the stabilizer feet P against the surface 52 to anchor the tractor C against movement. He then extends the bracket F with its cutting tooth G out from the main frame B by swinging the boom D and crowd E into the extended positions shown in FIGURE 1. The operator then manipulates the levers K for first causing the piston rod 20 to swing the frame F about its pivot 3 for moving the cutting tooth G into the blacktop J, and then for moving the boom D and crowd E for causing the tooth G to move in a plane paralleling the surface 52 for cutting a line 24 along the blacktop as shown in FIGURE 9. The stabilizer feet P or drop pads, prevent the tractor C from moving while the cutting tooth G is moved toward the main frame B of the backhoe.

When the cutting tooth G nears the main frame B with its cut, the operator can stop further cutting action and can raise the drop pads P and then with the tooth G embedded in the blacktop J as an anchor, can extend the boom D and crowd E for moving the tractor C away from the tooth without the necessity of getting into the tractor seat, not shown, and driving the tractor. When both the boom D and crowd E are again extended as shown in FIGURE 1, the operator can move the drop pads P, back into engagement with the surface 52 for holding the tractor from moving and can move the boom and crowd to make the tooth G continue its line of cut 24 through the blacktop J.

The novel shape of the cutting tooth G, will cause it to cut a line 24 along the blacktop J without prying up or dislodging portions of the blacktop lying adjacent to the cut. The undercut or bevelled sides 15a along the converging edges 12 defining the pointed end of the tooth G, will prevent these bevelled sides from engaging with the blacktop J, see FIGURE 9. Therefore the pointed tooth end will have no tendency to lift the surrounding area of blacktop while it is making its line of cut in it.

Furthermore, if the tooth G should penetrate the blacktop J to a point beyond the length of the pointed end of the tooth, then the edges 11a of the tooth surface 11, would do the cutting of the blacktop and the inwardly curved portions 14b of the sides 14a of the tooth as well as the sides 14a would not contact with the blacktop. There will be no tendency for the body portion of the tooth to lift any surrounding portion of the blacktop shown in FIGURE 9.

I claim:
1. A tooth for cutting blacktop and the like comprising:
 (a) an elongated body having a flat top surface; the front end of said body being pointed with the flat top surface at this pointed end being provided with inclined side edges that meet at the pointed end, the portion of the pointed end adjacent to the inclined side edges being undercut on a bevel so that any transverse section taken through said pointed end will have its widest expanse at the flat top surface;
 (b) the flat top surface of the body of said tooth having parallel side edges that extend rearwardly from the inclined side edges of the pointed end; the sides of the body having their outer parallel surfaces spaced inwardly from the parallel side edges of the flat top surface; and the body having inwardly curved portions extending from said parallel side edges of the flat top surface and merging into the outer parallel surfaces of said inwardly spaced sides; whereby any transverse section taken through said body and in back of said pointed end will have its widest expanse at the flat top surface; and
 (c) means for securing said tooth to a supporting shank.
2. The tooth structure as set forth in claim 1, and in which:
 (a) said body having a recess for receiving the tooth-supporting shank; said recess being formed by the spaced apart integral side walls of said tooth;
 (b) said side walls having inwardly-extending flanges with opposing edges that are flared slightly with respect to each other.

References Cited by the Examiner
UNITED STATES PATENTS

| | | | |
|---|---|---|---|
| 1,396,355 | 11/1921 | Chicoine | 37—145 X |
| 2,633,345 | 3/1953 | Nordone | 299—36 |
| 2,700,833 | 2/1955 | Small | 299—36 X |
| 3,195,250 | 7/1965 | Robinson | 37—145 |

FOREIGN PATENTS 135,215   11/1949   Australia.

CHARLES E. O'CONNELL, *Primary Examiner.*
ERNEST R. PURSER, *Examiner.*